United States Patent [19]

Lowell

[11] 3,719,819

[45] March 6, 1973

[54] VEHICLE HEADLIGHT WASHING SYSTEM

[76] Inventor: Rudolph L. Lowell, 710 Savings and Loan Building, Des Moines, Iowa 50309

[22] Filed: Feb. 25, 1971

[21] Appl. No.: 118,623

[52] U.S. Cl. .................240/7.1, 15/250.02, 239/284
[51] Int. Cl. .................................................B60q 1/00
[58] Field of Search .....240/7.1; 134/123; 15/250.01, 15/250.02; 239/284, 242, 255

[56] References Cited

UNITED STATES PATENTS 1,448,508   3/1923   Thum ..........................15/250.01 X
1,733,249   10/1929  Clinton.................................239/255
2,288,429   6/1942   Baughn ................................240/7.1
3,127,116   3/1964   Pollock et al..........................240/7.1
3,295,004   12/1966  Hirsch ..............................239/284 X Primary Examiner—Louis J. Capozi

[57] ABSTRACT

The headlight lens washer apparatus includes a fluid discharge tube supported for oscillating movement across the lens with one side thereof adjacent to and facing the lens. This facing side of the tube has a plurality of slit-like openings extended longitudinally of the tube and of relative lengths providing for a desired wash pattern on the surface area of the lens. The sheet-like sprays discharged from the tube act to concurrently remove and wash foreign material from the lens.

4 Claims, 7 Drawing Figures

PATENTED MAR 6 1973 3,719,819
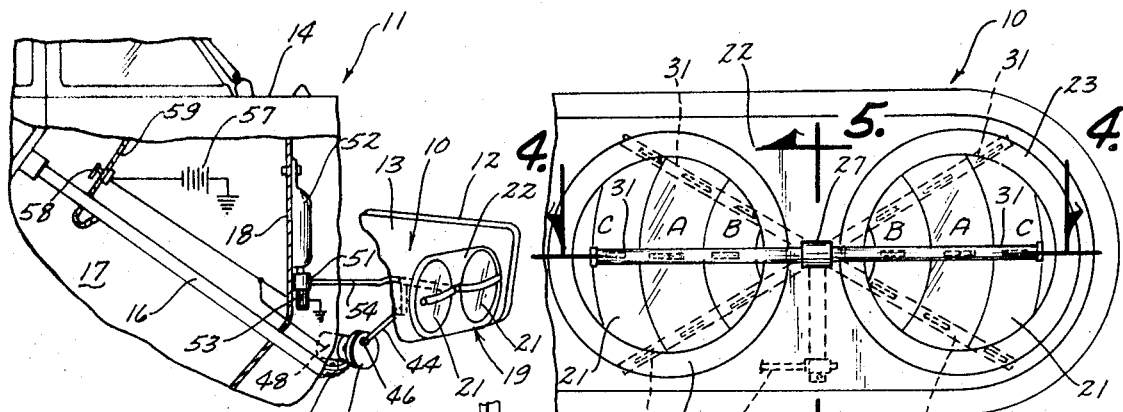
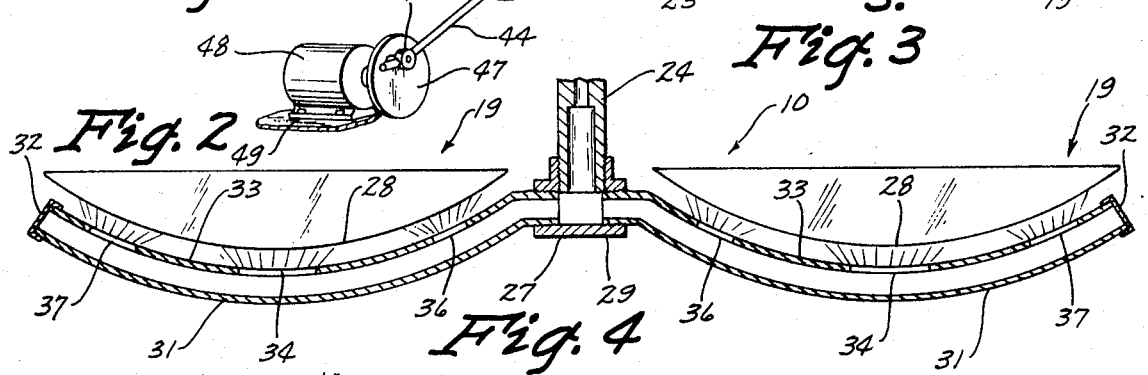
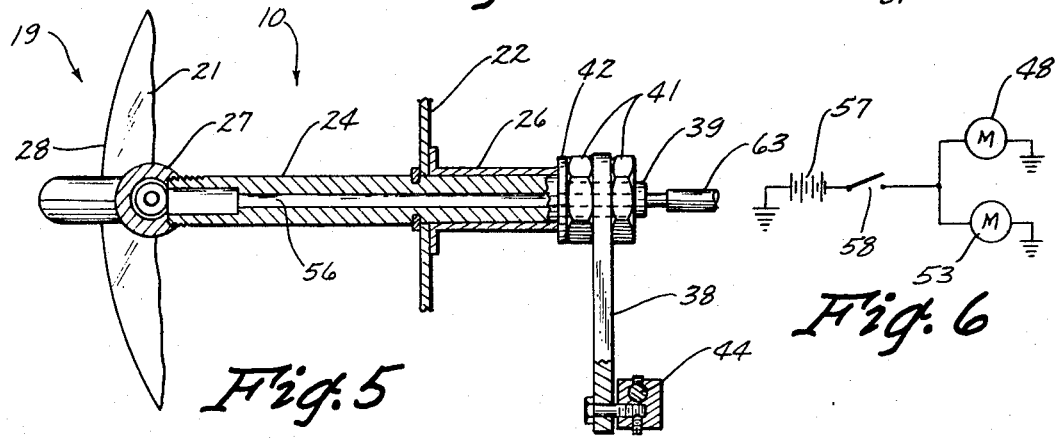
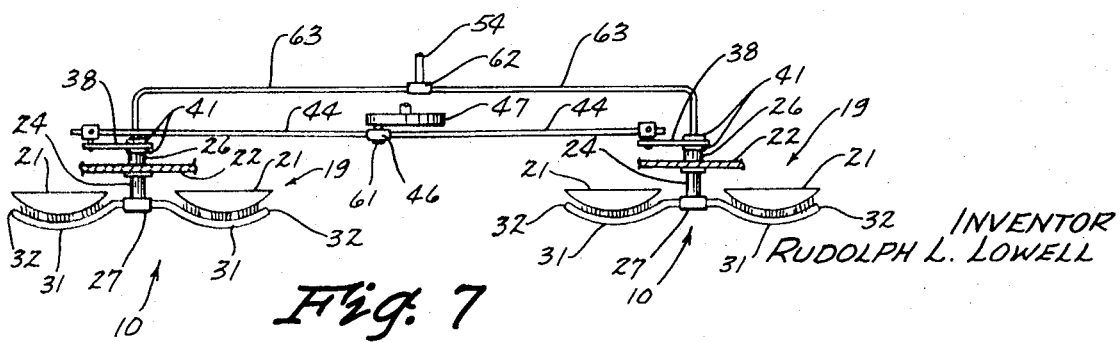
INVENTOR
RUDOLPH L. LOWELL

VEHICLE HEADLIGHT WASHING SYSTEM

SUMMARY OF THE INVENTION

The headlight lens washer system is of a simple construction and efficient in operation over a long service life with a minimum of maintenance and service attention. The sheet-like sprays or jets stricking against the curved surface of a lens remove and wash away most of the foreign material collected on the lens without requiring any coacting brush or wiper action. The elimination of a brush or wiper not only reduces the manufacturing and maintenance costs of the washer system but also eliminates a smearing of the lens at the initiation of the washer operation, which smearing can create a more serious driving hazard than the originally dirty headlight lens. Also, since the discharge openings in the tubular nozzle all face the lens, they are not subject to becoming clogged either by a normal travel of the vehicle or by a wiping of the headlights by station attendants.

BRIEF DESCRIPTION OF THE DRAWING

FIG. 1 is a diagrammatic illustration of a part of the driver's compartment and of a portion of the front end of a vehicle showing the assembly relation therewith of the headlight lens washer system of this invention;

FIG. 2 is a detail perspective view of the transmission system for oscillating a fluid discharge tube that forms part of the washer system;

FIG. 3 is an enlarged front elevational view of one of the dual headlights of the vehicle;

FIG. 4 is an enlarged fragmentary sectional view taken on the line 4 — 4 in FIG. 3;

FIG. 5 is an enlarged sectional detail view as seen along the line 5 — 5 in FIG. 3;

FIG. 6 is a diagrammatic illustration of the electrical control circuit for the washer system; and FIG. 7 is a schematic drawing showing the washer system coordinated for operation of a pair of dual headlights.

DETAIL DESCRIPTION OF THE INVENTION

Referring to FIG. 1 of the drawing, the headlight lens washer system of this invention, indicated generally as 10, is shown in assembly relation with a vehicle 11 having a front fender 12, a hood 13, a cowl 14 and a steering column 16 located within a driver's compartment that has a front fire wall 18. A dual headlight unit 19 includes a pair of headlights 21, held within a bezel or mounting structure 22 by retaining rings 23. Although the headlights 21 are illustrated as being in horizontal alignment, they may be vertically aligned. It is to be understood also that whether a single headlight or a dual headlight unit is used an identical arrangement of the washer system with the headlight will be employed at each side of the vehicle 11.

The washer system 10 (FIGS. 4 and 5) includes a rotatable tubular shaft 24 extended between and alongside each of the headlights 21 of a headlight unit 19. The shaft 24 is rotatably mounted within a bearing 26 (FIG. 5) that is suitably secured to the bezel or mounting structure 22. As best appears in FIG. 4, the forward end of the tubular shaft 24 is equipped with a T-connection 27 that is located rearwardly of the front portions of the headlight lenses 28. Extended in opposite directions longitudinally of the cross arm 29 of the T-joint 27 and across a corresponding headlight lens 28 is a pair of tubular fluid discharge or nozzle members 31, each of which has a closed terminal or outer end 32.

Each tubular nozzle member 31 (FIG. 4) is curved longitudinally thereof so as to conform substantially to the curvature of the surface of a lens 28 when extended horizontally diametrically across the lens. The concave side 33 of each tubular nozzle 31 is thus movable in close adjacence to the surface of a lens 28. A series of longitudinally extended slit-like fluid openings 34, 36 and 37 are formed in the concave side 33, with the opening 34 located centrally of a nozzle 31; the inner opening 36 at the nozzle end adjacent the rotatable shaft 24, and the outer opening 37 located at the end of a nozzle 31 remote from the shaft 24. These fluid openings are relatively formed to provide a desired cleaning and washing pattern on a headlight lens 28 that is predicated on the location of the openings in a tube 31 and the surface area of a lens 28 covered by a particular nozzle portion during its oscillating traverse of a lens.

Thus, referring to FIG. 3, it is seen that the surface area indicated as A, traversed by the central portion of a tubular nozzle 31 is of a greater arcuate length and radially extended length than either of the surface areas B and C, which are traversed by the inner and outer end portions, respectively, of a nozzle 31. It will also be noted that the surface area traversed by the outer end of a nozzle 31 is greater than that area B traversed by the inner end of the nozzle. In the same connection since the time interval for transverse of the surface areas A, B and C is the same for all portions of a nozzle 31, it will be apparent that if the fluid openings 34, 36 and 37 were of a like size a greater amount of fluid would be discharged in progressively greater amounts over the surfaces A, C and B taken in such order.

To equalize the fluid distribution pattern, and in turn the removal and washing action of foreign material from the over-all surface of a lens 28 the central opening 34 is larger than the outer opening 37 which in turn is larger than the inner opening 36. It has been found that a desirable washing action is obtained when the fluid discharge openings 34, 36 and 37 are of a slit-like form to provide for a fluid discharge of relatively high velocity and of a sheet-like form. Thus, in one embodiment of the invention wherein a lens 28 has a diameter of about five inches the central opening 34 has a length of 1¼ inches; the outer opening 37 a length of 1 inch and the inner opening 36 a length of three quarters of an inch; with each of the openings having a width of approximately one sixty-fourth of an inch. In this embodiment a tubular nozzle 31 has an inner diameter of about one-fourth of an inch so that the cross sectional area of the fluid passage in a nozzle 31 is greater than the combined areas of the openings 34, 36 and 37 whereby to assure a full volume velocity flow through each of the openings.

For oscillating the tubular shaft 24 to move the tubular nozzles 31 back and forth across corresponding lenses 28, a rock arm 38 is attached to the shaft rearwardly of the mounting structure 22 (FIG. 5). The arm 38 is mounted about a reduced threaded rear end section 39 of the tubular shaft 24 for locking engagement between a pair of locking nuts 41. Also mounted on the reduced section 39 and at the forward end thereof is a washer 42 that is engageable with the rear face of the journal bearing 26 to limit the forward movement of the shaft 24. Rearward axial movement of the shaft 24 is limited by a retainer ring 43 mounted thereon for engagement with the front surface of the mounting structure or bezel 22. The free end of the rock arm 38 is pivotally connected to one end of a power transmission link or rod 44 (FIG. 5) the opposite end of which is mounted at 46 (FIGS. 1 and 2) for rotation on an eccentric 47 carried on the shaft of an electric motor 48 which is suitably secured to a portion 49 of the vehicle 11.

Fluid under pressure is supplied to the tubular shaft 24 from a pump 51 operatively associated with a water reservoir 52. The pump 51, reservoir 52, and electric motor 53 for operating the pump are carried on the fire wall 18. The outlet of the pump 51 is connected by a fluid supply line 54 to the rear end of the passage or bore 56 formed in the tubular shaft 24.

As shown in FIG. 6, the motor 48 for oscillating the shaft 24 and pump motor 53 are connected in parallel with the vehicle battery 57 for concurrent actuation from a single control switch 58. Thus, on actuation of the switch 58, which as shown in FIG. 1 may be carried on the instrument panel 59 of the vehicle, fluid under pressure is supplied to the nozzle members 31 concurrently with an oscillation of the shaft 24 to move the nozzle members back and forth across the surfaces of the headlight lenses 28 between the positions therefor shown in dotted lines in FIG. 3.

Relative to a pair of the headlight units 19, and as shown in FIG. 7, a pair of transmission rods 44 corresponding to the pair of washer systems 10 have inner adjacent ends rotatably supported at 61 to the eccentric 47 of the electric motor 48. Also, it will be noted that the fluid supply line 54 from the pump 51 is in a T-connection 62 with a pair of feeder lines 63 each of which is connected to a corresponding shaft 24 of a washer system 10.

Although the invention has been described with respect to a preferred embodiment thereof, it is to be understood that it is not to be so limited since changes and modifications can be made therein which are within the full intended scope of this invention as defined by the appended claims.

I claim:

1. A washing system for the headlight lens of a vehicle having a front end portion for mounting a headlight comprising:
   a. an oscillatable tubular shaft mounted on said front end portion along side of said headlight having an extension projected laterally therefrom over said lens,
   b. said extension having a closed terminal end and a series of elongated fluid openings extended longitudinally of said extension in the side thereof facing said lens, said openings being of varying lengths and relatively spaced longitudinally of said extension to equalize the distribution of fluid discharged therefrom over the surface of said lens when said shaft is oscillated,
   c. said extension having a fluid passage with a cross sectional area greater than the combined area of said fluid openings,
   d. means for oscillating said tubular shaft to move said extension back and forth across said lens during a headlight washing operation, and
   e. means for supplying fluid under pressure to said shaft, concurrently with the oscillation thereof, for discharge through said openings onto said lens.

2. The washing system for the headlight lens of a vehicle according to claim 1 wherein:
   a. said extension is of an arcuate shape corresponding to the curvature of said lens with the concave side thereof adjacent to and facing said lens.

3. The washing system for a headlight lens of a vehicle according to claim 1 wherein:
   a. said fluid openings are relatively formed so that the central portion of the extension discharges a greater amount of fluid than either of the end portions thereof, and the end portion adjacent the shaft discharges of lesser amount of fluid than the end portion remote from said shaft.

4. The washing system for a vehicle head light lens according to claim 1 wherein:
   a. each of said fluid openings has a length to width ratio such that fluid is discharged therefrom in a sheet form to dislodge and wash foreign material from the surface of said lens.

* * * * *